US008649766B2

(12) United States Patent
Kemshall

(10) Patent No.: US 8,649,766 B2
(45) Date of Patent: Feb. 11, 2014

(54) AUTHENTICATION APPARATUS

(75) Inventor: Andrew C. Kemshall, Basingstoke (GB)

(73) Assignee: SecurEnvoy PLC, Reading (GB)

( * ) Notice: Subject to any disclaimer, the term of this patent is extended or adjusted under 35 U.S.C. 154(b) by 464 days.

(21) Appl. No.: 12/649,485

(22) Filed: Dec. 30, 2009

(65) Prior Publication Data

US 2011/0159846 A1  Jun. 30, 2011

(51) Int. Cl.
  *H04M 1/66*  (2006.01)
(52) U.S. Cl.
  USPC .................. 455/411; 455/410; 726/7; 726/5
(58) Field of Classification Search
  USPC .............. 726/2, 5; 705/72; 713/184–185; 455/410–411
  See application file for complete search history.

(56) References Cited

U.S. PATENT DOCUMENTS

| 7,275,263 | B2 * | 9/2007 | Bajikar et al. ............. 726/28 |
| 2003/0163739 | A1 | 8/2003 | Armington et al. |
| 2008/0307515 | A1 * | 12/2008 | Drokov et al. ............. 726/7 |
| 2008/0319887 | A1 | 12/2008 | Pizzi et al. |
| 2010/0199086 | A1 * | 8/2010 | Kuang et al. ............. 713/155 |

FOREIGN PATENT DOCUMENTS

| DE | 10058249 A1 | 6/2002 |
| EP | 1075161 A2 | 2/2001 |
| EP | 1406459 A1 | 4/2004 |
| WO | WO-97/31306 A1 | 8/1997 |
| WO | WO-99/10793 A1 | 3/1999 |
| WO | WO-03/083793 A2 | 10/2003 |
| WO | WO-2010/090602 A1 | 8/2010 |

OTHER PUBLICATIONS

"New SMS Passcode 3.0 Simplifies Enterprise Class Two-Factor Authentication for Mainstream Adoption"; Copenhagen, Aug. 18, 2009; http://www.smspasscode.com/Default.aspx?ID=501; pp. 1-4.

* cited by examiner

*Primary Examiner* — Jinsong Hu
*Assistant Examiner* — Nathan Taylor
(74) *Attorney, Agent, or Firm* — Novak Druce Connolly Bove + Quigg LLP

(57) ABSTRACT

Multi-factor authentication apparatus pre-loads a first factor, for example a passcode, to user equipment such as a mobile telephone. The user subsequently initiates access to a protected product or service, triggering the apparatus to run a multi-factor authentication process, via an access device such as a computer connected to the Internet. The user enters the pre-loaded first factor, together with another factor such as a UserID and PIN. The pre-loading avoids vulnerability to communications problems at the time the user initiates access. Pre-loading is done every time an access session terminates for the user, either successful or failed and a user profile data store is used to manage passcodes in a manner that allows incorrectly entered first factors to be retried when delivery to user equipment is not possible.

9 Claims, 3 Drawing Sheets

AUTHENTICATION APPARATUS

The present invention relates to authentication apparatus. It finds particular application in multi-factor authentication.

In industry, "two factor authentication" is a widely used term which describes a way of strongly authenticating a user trying to logon. There are three ways to identify a person: something they know such as a password; something they own such as a credit card; or something they are, such as a fingerprint. Two factor authentication simply means bringing two of these factors together and is interpreted largely as something you know (such as a password) and something you own (such as a token, phone or credit card).

Various attempts at using a mobile phone as a factor in authentication have been made by on-line banking portals and manufacturers of two factor authentication equipment, these all following a similar technique as follows:—

The user logs on to a computer application by first entering their user identity ("UserID") and a personal identification number ("PIN"), these being something they know. If these credentials are correct, a one time passcode (typically six digits) is then sent from an authentication server as a text message to the user's mobile phone, this being something they own. The user enters this passcode, proving they possess the phone. After this passcode has been used it is locked to prevent any hackers or un-authorised person from trying to replay the already used passcode.

Such a technique has at least one serious drawback: it assumes that the passcode text message to the mobile phone can be sent in a quick and reliable fashion. It does not take into account the following three issues:

1. Mobile Phone Text Message Delivery Delays

Although most mobile phone text messages are transmitted in seconds, it's common to find them delayed when networks become congested. Mobile phone text traffic is not sent point to point, it is 'queued' and then sent on to the required network cell where it is again queued and finally sent to the end user's phone. This queuing gives rise to delays at peak operator periods. Vodafone's own sales literature claims that 96% of all mobile phone text messages are delivered within twenty seconds. This means that 4% of users trying to authenticate can fail and will need to raise a help desk call to gain emergency access. Thus for a deployment of five thousand users authenticating each day, two hundred help desk calls would be raised per day.

2. Signal Dead Spots

Mobile phone signals are not always available particularly in buildings with wide outer walls, in underground basements or in computer rooms that give off high radio frequency ("RF") noise. Consider a user trying to authenticate in one of these locations. They would first enter their UserID and PIN and would then fail to receive their passcode. They would next need to move to a location that has a signal, receive their passcode, and move back to the original location to enter their passcode, all of this within a timeout period of two minutes. Users in these locations would generally have no alternative but to raise help desk calls to gain emergency access.

3. Mobile Phone is Used to Connect to the Internet

In some cases when a mobile phone is used to create a data connection it cannot receive mobile phone text messages. Users trying to utilise their mobile phone as a way of connecting to the Internet would not receive their passcode until they hang-up the data connection. End-users would need to start authenticating the UserID and PIN, hang up the connection, wait for the mobile phone text message, reconnect and re-enter their UserID, PIN and passcode, again all within two minutes.

These problems arising in sending passcodes as the user logs on present serious reliability issues, particularly when scaled to higher numbers of users as the chances of incurring a text delivery delay or intermittent signal loss become higher.

In a known arrangement designed to overcome the transmission problems mentioned above, a security code generator can be installed on the user equipment. This generates security code at short intervals, for example every thirty seconds, which the user can present in an authentication process. However, it means loading a specialised application to the user equipment and deploying a unique key (seed record) which requires co-ordination with the remote authentication apparatus as to which key is associated with which user.

A major problem with an approach that requires an application to be loaded on user equipment such as a mobile phone is the large number and diverse types of mobile equipment. This leads to a major support and deployment problem. In addition, many users change they mobile phone every year or so. Redistribution of an application along with its unique key leads to even larger support and quality testing problems.

According to a first aspect of embodiments of the present invention, there is provided a method of using authentication apparatus to authenticate an access operation by a user by means of a multi-factor authentication process, the user having an associated access device and an associated notification device, said method including the step of notifying to the user's notification device at least one factor for use in the multi-factor authentication process, the method comprising:
transmission over a public network of a first factor of the multi-factor authentication process, in a notification message addressed to the notification device; and
detection at the authentication apparatus of initiation of the multi-factor authentication process from the access device, the detection being subsequent to said transmission.

This sequence of steps, in which the first factor is transmitted in advance of initiation of an authentication process by a user, means that the first factor is "pre-loaded" to the user's notification device. This can resolve issues such as intermittent phone signals or delayed mobile phone text delivery arising at the time of the authentication process.

The access device might typically be computer apparatus for accessing a product or service online in a secure manner. For secure multi-factor authentication, the notification device is preferably independent of the access device. Conveniently, the notification device might be a mobile device such as a mobile telephone, in which case the notification message could be addressed. simply by use of a mobile telephone number. The notification message might be in the form of a text message or the like.

After initiation, the multi-factor authentication process may further comprise receipt at the authentication apparatus, from the access device, of the first factor and a second factor, whereby the authentication apparatus is provided with two factors for use in said multi-factor authentication process.

A first factor might comprise for example a randomly generated passcode. A second factor might comprise for example a UserID, a PIN and/or a password.

The step of transmitting the first factor over a public network might be carried out by the authentication apparatus or by a separate platform for providing authentication factors. If a separate platform is used, that platform will also have to notify the authentication apparatus each time a fresh factor is transmitted. This however could be done securely, for instance over a non-public network if appropriate.

The first factor pre-loading operation can also be extended to accommodate neatly a situation where an established user at least temporarily can't receive new text messages, by maintaining a store of previously transmitted but unused factors in relation to a user. Users trying to logon who do not currently have the ability to receive text messages can still reliably authenticate if they enter a previously transmitted first factor, such as a passcode, as long as it has not been used before. This maintains the security of single-use passcodes but circumvents problems with notification by text message such as those mentioned above.

A method according to embodiments of the present invention which can accommodate the use of one of a set of notified factors further comprises the steps of:
  maintaining a store of two or more first factors transmitted to a specified notification device; and
  locking each first factor after receipt at the authentication apparatus for use in an authentication process.

Locking a first factor might be done for example by deleting it from the store or by adding a flag to indicate previous use, the authentication process being alerted by the flag to reject subsequent use of that factor.

Having more than one first factor valid at the same time avoids the situation where a user, having initiated authentication, miss-enters or fails to enter a passcode. In known systems, a new passcode would be generated and the user could not then be authenticated until they have received that new passcode. In embodiments of the present invention, the user can revert to an earlier passcode and be successfully authenticated without having to receive a new passcode.

The transmission of first factors to a notification device can cause difficulties of scale. If for example the first factors are sent periodically to a large number of users, it could generate bursts of high traffic levels and it may be that a large number of first factors are sent unnecessarily. Many user profiles may then contain many more first factors, such as passcodes, than the relevant user would ever require. To avoid these problems of potential congestion and large user profiles, it is possible to limit the number of first factors sent to any one user. However, another perhaps complementary approach is to send a new first factor after each authentication attempt by a user. This triggers transmission of a fresh first factor at a time when an individual user is actively trying to gain access to a service or product via an access device. Users who make few attempts to gain access will be sent few first factors.

Methods according to embodiments of the present invention may therefore further comprise:
  termination of a multi-factor authentication process in relation to a user; and
  in response to said termination, transmission over a public network of a new first factor for use in the multi-factor authentication, in a notification message addressed to the notification device of that user.

Termination might be either because the user has been successfully authenticated or because the authentication process has failed. For example, if a user sends an incorrect second factor, the authentication process will fail. Thus the notification device will be sent a fresh first factor whenever the user is active in attempting access and not just when such an access attempt is successful. Further, the user will be notified with a new first factor promptly, in the event that they enter an incorrect first factor.

According to a second aspect of embodiments of the present invention, there is provided authentication apparatus for use in authenticating an access operation by a user by means of a multi-factor authentication process, the user having an associated access device and an associated notification device, said apparatus comprising:
  a user profile data assembler for assembling data in relation to the user;
  a notification message transmitter for assembling and transmitting a message containing a first factor to the user's notification device; and
  an authentication factor receiver for receiving factors of the multi-factor authentication from the user's access device and for authenticating the user;
  wherein the notification message transmitter is triggerable to assemble and transmit a message containing a new first factor to the user's notification device on termination of the multi-factor authentication process in respect of that user.

In authentication apparatus as described above, the user profile data assembler may be adapted to store each transmitted first factor in the assembled data in relation to the user, and to lock each stored first factor once received by the authentication factor receiver from the user's access device. In particular, the user profile data assembler may store two or more valid first factors in relation to one user at the same time so that the user can enter any of those two or more factors and be successfully authenticated.

As discussed previously, locking might be done for example by deletion or by flagging, or in any other manner.

It is to be understood that any feature described in relation to any one aspect or to any one embodiment of the invention may be used alone, or in combination with other features described, in relation to the same or one or more other aspects or embodiments of the invention if appropriate.

Authentication apparatus according to an embodiment of the invention will now be described, with reference to the accompanying figures in which.

Figure 1A:
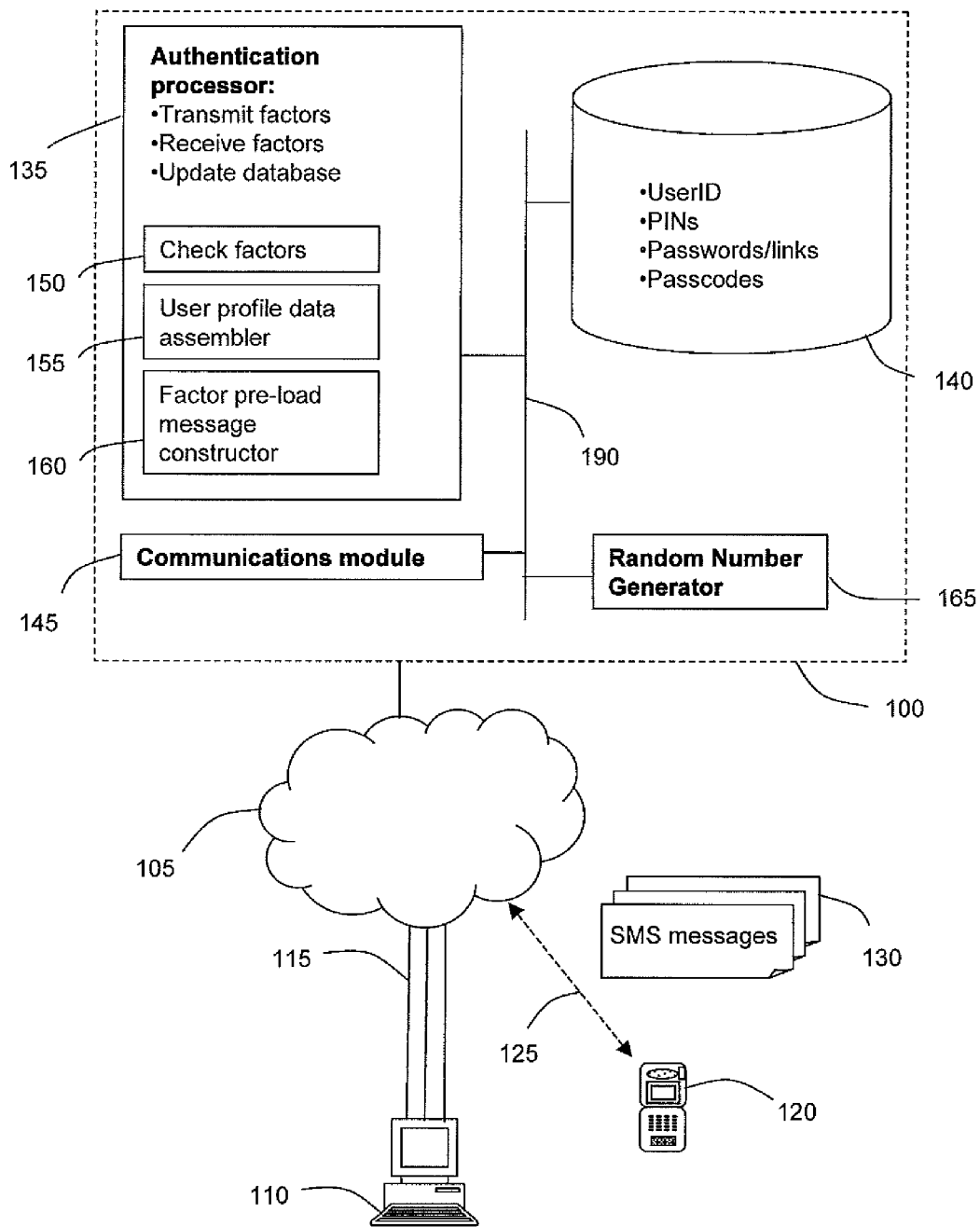
FIG. 1A shows a functional block diagram of the authentication apparatus.

Referring to FIG. 1A, the authentication apparatus 100 is connected in known manner via an external interface or interfaces 145 to a public communication system 105 that includes different technologies, in particular the Internet 115 and mobile telephony channels 125. This enables communication with a user's access device, such as computer equipment 110, by Internet protocol over data links 115 and with a user's separately addressable notification device, in this case a mobile device 120, over a cellular telephone network 125 for delivery of Short Message Service ("SMS") messages 130, also known as text messages. The authentication apparatus 100 comprises an authentication processor 135 together with a user profile database 140 which stores authentication data in relation to a set of enrolled users. Components of the authentication apparatus 100 are connected for internal communication via an internal network such as a local area network ("LAN") 190.

It may not be essential to use a cellular telephone network to deliver SMS messages as described below but it is preferred that the authentication apparatus can send data to a user's notification device 120 which has a unique network address, this ensuring that the user has physical possession of the notification device 120. Mobile devices such as telephones offer this in convenient form although other devices might offer an alternative.

An outline of the functioning of the authentication apparatus 100 in relation to a user accessing a secure application or database is as follows. The authentication apparatus 100 pre-loads a passcode to the user's mobile phone 120 via a text message 130 during each authentication attempt by the user or when they are first enrolled. When the user wishes to login via their computer equipment 110, they first enter their UserID and PIN (or operating system password) and then obtain that pre-loaded passcode from their mobile phone 120 and enter this as the final part of the login process. The authentication apparatus 100 will then run an operation that checks if the correct user name, PIN (or password) and passcode have been entered and allows the user access to the secure application or database, if these are correct. It then creates a new passcode which is sent as a text message to the user's mobile phone 120 for their next authentication attempt. The newly created passcode is stored along with previously created codes, in the user profile database 140, to allow for valid entry of a passcode from users that cannot receive a fresh text message. If a correct code is entered then the corresponding passcode is deleted from the store 140 to prevent reuse.

The authentication apparatus 100 comprises an authentication processor 135, the user profile database 140 and a communications module 145, although it might be noted that the database 140 may in practice be located elsewhere and might be at least partly maintained by an independent organisation or service.

The authentication processor 135 has at least three primary modules, these being:
Check factors module 150
User profile data assembler 155
Passcode pre-load message constructor 160

The check factors module 150 is of known type, operating to authenticate access by a user after presentation of two or more factors of a multi-factor authentication process, such as UserID and PIN followed by a passcode. It can also be described as an "authentication factor receiver" for receiving factors of the multi-factor authentication from the user's access device 110 and for authenticating the user.

The user profile data assembler 155 maintains a stored set of passcodes for each user, deleting passcodes after use. A random number generator 165 provides newly generated passcodes, preferably of high quality in authentication terms, and these are received or read by the user profile data assembler 155 which delivers them to both the user profile database 140 and to the passcode pre-load message constructor 160.

The passcode pre-load message constructor 160 responds to receipt of a newly generated passcode by using information from the relevant user profile to assemble and address a text message to the user's mobile phone 120, and sending the message via the communications module 145. For example, the user profile data assembler 155 might send both the UserID and the newly generated passcode to the passcode pre-load message constructor 160 or it might provide the user's mobile telephone number directly to the passcode pre-load message constructor 160.

The passcode pre-load message constructor 160 assembles and transmits a message containing a first factor to the user's notification device 120 and can be alternatively described as "a notification message transmitter". In some circumstances, the first factor might be described otherwise than as a passcode, for example comprising a PIN.

The user profile database 140 is of known type, containing a set of searchable user profiles. Each user profile contains authentication data for the user, this being a UserID, a PIN and/or a password or a link to an external password, and contact details for the user. The contact details will contain at minimum a mobile number for delivery of passcodes to the user by text message.

Importantly, in embodiments of the invention, the user profile is structured also to contain multiple valid passcodes for the relevant user at the same time. For example, it may contain multiple passcode fields or support pointers to multiple passcodes stored in the database 140. At any one time, a set of one or more passcodes may have been received from the passcode set constructor 155. This set of passcodes is used in monitoring use of the passcodes by the user, being locked after receipt from the user's access device 110, and can contain two or more valid passcodes for the user. Hence the user has the option of two or more valid passcodes for use during an authentication process.

The communications module 145 is also of known type, providing interfaces to data connections 115 via the Internet for receiving authentication data from users via their computer equipment 110, and to SMS messaging 125 to support the provision of passcodes to the users' mobile equipment 120. It thus generally provides an external text message gateway or modem device.

Figure 2:
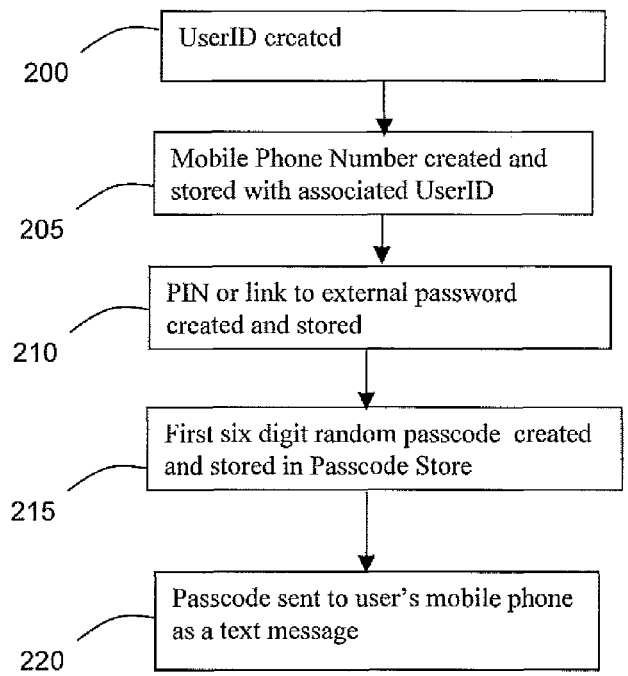
FIG. 2 shows a flow chart of a configuration process for establishing a new user.

Referring to FIG. 2, an online user enrolment operation performed by the authentication apparatus 100 when a new user is created is as follows.

STEP 200: A UserID that is unique to the user's logon is first created and stored in the user profile database 140, in a permanent storage area. This is carried out by the user profile data assembler 155 on initiation by a user or administrator or by another software process.

STEP 205: The number of the user's mobile device 120 is also requested by the user profile data assembler 155 and stored in the user profile database 140, associated with the UserID.

STEP 210: A PIN is created and stored in the user profile database 140. Alternatively, a link to allow an external password (typically from an operating system) is set up.

STEP 215: After a user profile has been created in the user profile database 140 by the user profile data assembler 155, it requests a first passcode (typically a six digit number) to be randomly generated using the random number generator 165. This passcode is saved in the user profile database 140 in association with the UserID.

STEP 220: This passcode is also delivered to the passcode pre-load message constructor 160 which sends it to the user's mobile phone 120 as a text message via the communications module 145 which provides an external text message gateway or modem device.

Figure 3:
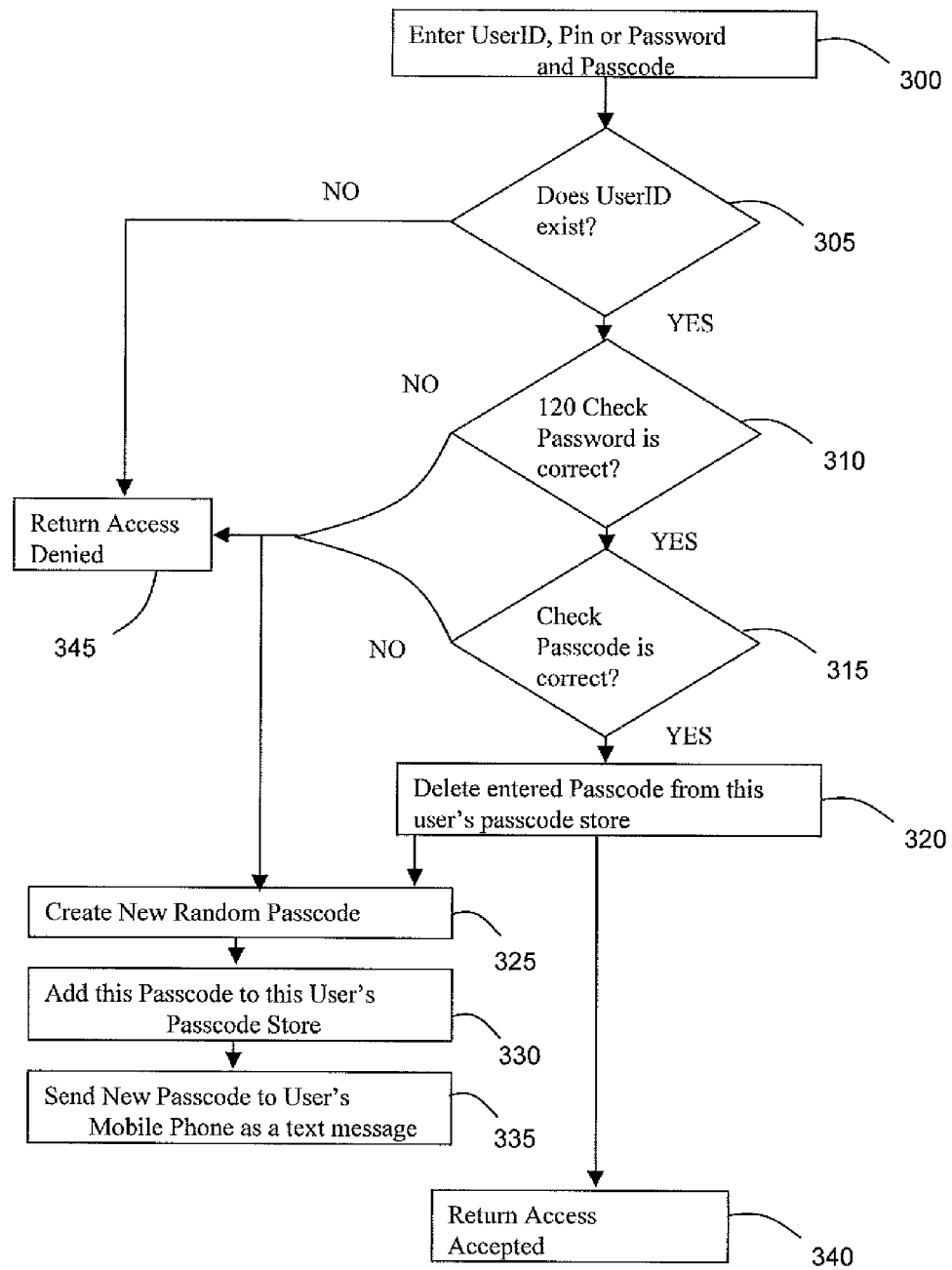
FIG. 3 shows a flow chart of the authentication apparatus in use by a user.

Referring to FIG. 3, a multi-factor authentication process performed by the authentication apparatus 100 in response to initiation by a user is as follows.

STEP 300: When a user requires access to a computer application, product or service they first initiate a logon request by sending their UserID, PIN or password and passcode via their access device 110 to the authentication apparatus 100.

STEP 305: The "check factors" module 150 of the authentication apparatus 100 first checks if the UserID is present in the user profile datastore 140. If the UserID is not present, then the process moves to STEP 345 (access denied). If the UserID is present, then the apparatus 100 moves to STEP 310.

STEP 310: The "check factors" module 150 retrieves a stored PIN, and/or follows an external link to a password, either of which is associated with the UserID. If the user has used a PIN, then the user-entered PIN is checked for a match. If an external password is used then the external computer system is contacted and requested to check the user-entered password. If the PIN or password are incorrect, then the process bifurcates. It moves to STEP 345 (access denied) and also to STEP 325 (create new random passcode). If the PIN or password are correct, then the process moves to STEP 315.

STEP 315: The "check factors" module 150 accesses the user profile that is associated with the UserID and a check is made to see if the user-entered passcode is listed as one of a set of valid passcodes for that user. If the passcode is not listed, then the process again bifurcates. It moves to STEP 345 (access denied) and also to STEP 325 (create new random passcode). If the passcode is listed, the process moves to STEP 320.

STEP 320: The user profile data assembler 155 deletes the listed passcode from the user profile to prevent it being used again. The process again bifurcates. It moves to STEP 340 (access accepted) and to STEP 325.

STEPs 325, 330: The user profile data assembler 155 requests a new random passcode from the random number generator 165 and stores it in the user profile associated with the UserID in the user profile datastore 140. The process moves to STEP 335.

STEP 335: The passcode pre-load message constructor 160 assembles a text message containing the new random passcode and sends it to the user's mobile phone 120 as a text message via the communications module 145.

STEP 340: The authentication processor 135 returns an "access accepted" response to the access device 110 of the authenticating user that allows the user to access the requested resource and the multi-factor authentication process terminates.

STEP 345: The authentication processor 135 returns an "access denied" response to the access device 110 of the authenticating user and the multi-factor authentication process terminates.

It will be understood how, in going through the above process, a user can accumulate more than one pre-loaded, valid passcode on their notification device 120. They receive a passcode when they first enroll. After being authenticated successfully, the passcode will be locked and a fresh one sent. If the user then makes a failed attempt to authenticate, perhaps having entered an incorrect PIN, they are automatically sent a fresh passcode, meaning there are now two valid passcodes available to that user. Even if they cannot pick up the fresh passcode, they can still use the passcode that was sent on enrolment.

Figure 1B:
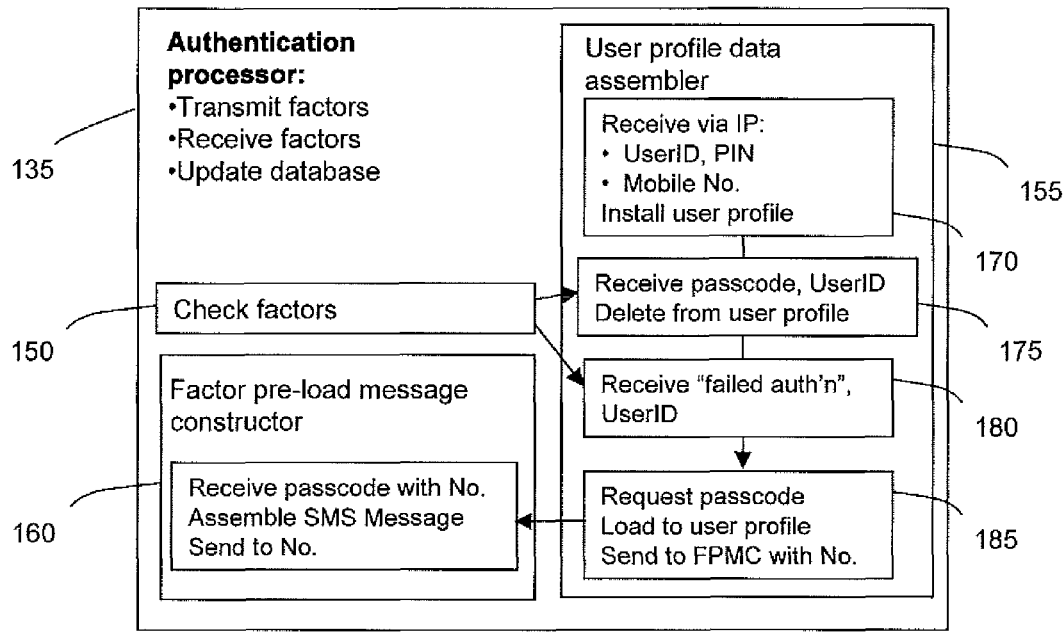
FIG. 1B shows an authentication processor used in the apparatus of FIG. 1A, in more detail.

Referring to FIG. 1B, components of the authentication processor 135 to support the operations described above are now described in more detail. Data flow between the components will be co-ordinated via the LAN 190 by a process of known type. Main data flows during the multi-factor authentication process described above in relation to FIG. 3 is shown by arrows.

The user profile data assembler 155 has the following components:
 a user profile installer 170
 a passcode deleter 175
 a failed authentication detector 180
 a fresh passcode installer 185

The user profile installer 170 receives data during the enrolment process described above in relation to FIG. 2. This is of known general type but, having installed a new user profile, it will trigger the fresh passcode installer 185 by sending the UserID.

The passcode deleter 175 will receive notification from the check factors module 150 when a passcode has been correctly entered by a user. The check factors module 150 supplies the passcode and the UserID to the passcode deleter 175 so that the passcode can be deleted from the relevant user profile. The passcode deleter 175 will trigger the fresh passcode installer 185 by sending the UserID.

The failed authentication detector 180 will receive notification from the check factors module 150 when any authentication process has failed. In this case, only the UserID will be supplied. The failed authentication detector 180 will trigger the fresh passcode installer 185 by sending the UserID.

In each case above, the fresh passcode installer 185 is supplied with at least the UserID. Having the UserID, the fresh passcode installer 185 can search the database 140 for the user's mobile number as well as loading a new passcode to the right user profile. The passcode and mobile number can then be delivered to the factor pre-load message constructor 155 for sending to the user's mobile device 120.

There are several alternative ways of implementing embodiments of the invention as described above. For example, the user profiles in the datastore 140 might be designed to hold a set number, for example three or more, unused passcodes in relation to each UserID. In a first alternative embodiment, the passcode store 140 is not limited to a set number of passcodes and stores all created passcodes since the user was last granted access. After a correct passcode is entered, all previously created passcodes up to the one entered are then deleted by the user profile data assembler 155.

In a second alternative embodiment of this invention, three or more passcodes are randomly generated when first enrolling the user and after each authentication attempt. These passcodes are saved in (or referenced by) the user profile that is associated with this UserID. All three or more of these passcodes are then sent to the user's mobile phone 120 as a single text message via an external text message gateway or modem device 145. This operation allows for up to three or more successful authentications before requiring the next text message to be delivered to the user's mobile phone 120.

In a third alternative embodiment a passcode is created and stored in the datastore 140 at fixed times once a day, or after a number of days for example once a week. The passcode store 140 only stores two passcodes in relation to each UserID. These passcodes are re-usable throughout the period of their lifetime. After a valid passcode is correctly entered by the user, it is known to have been delivered to the phone 120 and thus the previous passcode is deleted. This mechanism allows for up to one day (or longer with multiple day codes) for delivering a text message to a phone 120. A periodically sent code set to one day will have a life time of up to two days before it is unavailable as the passcode store 140 only allows two passcodes in relation to each UserID.

The invention claimed is:

1. A method of using authentication apparatus to authenticate an access operation by a user by means of a multi-factor authentication process, the user having an associated access device and an associated notification device, said method including the step of notifying to the user's notification device at least one factor for use in the multi-factor authentication process, the method comprising:
 transmission by the authentication apparatus of a first factor of the multi-factor authentication process, in a notification message addressed to the notification device, said transmission occurring prior to the user requesting initiation of the multi-factor authentication process;
 detection at the authentication apparatus of initiation of the multi-factor authentication process from the access device;

maintaining at the authentication apparatus a store of two or more valid first factors transmitted to a specified notification device;

maintaining a store of two or more valid first factors in relation to a single user at the same time;

locking by the authentication apparatus each transmitted first factor after receipt at the authentication apparatus for use in an authentication process, against subsequent use;

receipt at the authentication apparatus, from the access device, of the first factor and a second factor, whereby the authentication apparatus is provided with two factors for use in said multi-factor authentication process.

2. A method according to claim 1 wherein the access device comprises computer apparatus for accessing a product or service online in a secure manner.

3. A method according to claim 1 wherein the notification device is independent of the access device.

4. A method according to claim 1 wherein the notification device comprises a mobile device and the notification message is addressed by use of a mobile telephone number.

5. A method according to claim 4 wherein the notification message comprises a text message.

6. A method according to claim 1, further comprising:
termination of a multi-factor authentication process in relation to a user; and
in response to said termination, transmission of a new first factor for use in the multi-factor authentication, in a notification message addressed to the notification device of that user.

7. A method according to claim 1, wherein said transmission of a first factor, or of a new first factor, comprises transmission over a public network.

8. Authentication apparatus comprising a processor, for use in authenticating an access operation by a user by means of a multi-factor authentication process, the user having an associated access device and an associated notification device, said apparatus further comprising:

a user profile data assembler for assembling data in relation to the user;

a notification message transmitter for assembling and transmitting a message containing a first factor to the user's notification device; and an authentication factor receiver for receiving factors of the multi-factor authentication from the user's access device and for authenticating the user;

wherein the notification message transmitter is triggerable to assemble and transmit a message containing a new first factor to the user's notification device by termination of the multi-factor authentication process in respect of that user;

wherein the user profile data assembler is adapted to store two or more valid first factors in relation to one user at the same time, each transmitted first factor being locked after receipt at the authentication apparatus for use in the authentication process, against subsequent use;

wherein the user profile data assembler is adapted to store each transmitted first factor in the assembled data in relation to the user, and to lock each stored first factor once received by the authentication factor receiver from the user's access device; and wherein the user's access device and notification device have different network addresses and the notification message transmitter is configured to transmit the message containing a new first factor to the network address of the notification device.

9. Authentication apparatus according to claim 8, further comprising a user profile database structured to store two or more valid first factors in relation to one user at the same time.

* * * * *